Sept. 1, 1953    W. BORCOVEC    2,650,587
MASSAGE APPLIANCE WITH HEATING DEVICE
Filed March 12, 1951

Werner Borcovec
INVentor.
By: Henderoth, Lind & Ponack
Attorneys.

Patented Sept. 1, 1953

2,650,587

UNITED STATES PATENT OFFICE 2,650,587

MASSAGE APPLIANCE WITH HEATING DEVICE

Werner Borcovec, Minusio, near Locarno, Switzerland, assignor to Alfred Schadrack, Riva S. Vitale, Tessin, Switzerland Application March 12, 1951, Serial No. 215,065
In Switzerland August 22, 1950

9 Claims. (Cl. 128—24.1)

The present invention relates to a message appliance with a heating device, which may be particularly designed for rubbing creams into the face. In order to introduce cosmetic means consisting of waxes and fats into the pores of the skin, heat is required. In the massage appliance of this invention, this heat is supplied from a cartridge having a substance and containing in a vessel a liquid for reaction with the substance necessary for production of heat by exothermic action. At least one part of the multipartite appliance, for example, the handle or the kneading head incorporates means adapted to destroy the vessel or container when the appliance is put together.

Further features of the invention will appear from the claims, specification and drawing which represents by way of example only a preferred form of embodiment of the invention.

Figure 1:
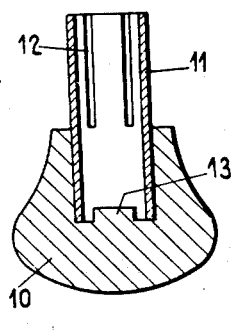
Fig. 1 is a longitudinal section of the kneading head and a metallic sleeve firmly connected therewith.

With reference to the drawing, numeral 10 designates a kneading head of metal firmly connected with a metallic sleeve 11. This sleeve is provided with elongated slots 12 so as to render it resilient. The recess of the kneading head 10, receiving the sleeve 11, has at its bottom a projection 13. The handle 14 which consists of a heat-insulating material such as wood or rigid plastics, has a recess 15 by means of which it can be placed over the sleeve 11. Provided at the bottom of recess 15 there is again an axially disposed projection 16. The handle 14 is held frictionally on the sleeve 11 although other obvious ways can be used.

Figure 3:
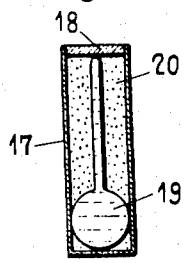
Fig. 3 is a longitudinal section of the heating cartridge.
Figure 4:
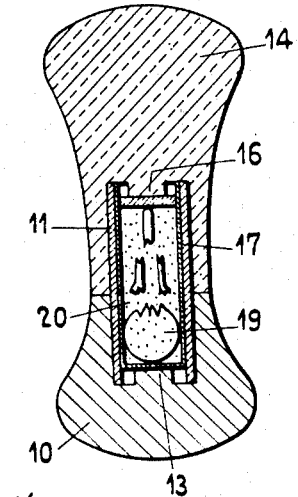
Fig. 4 is a longitudinal section of the massage appliance as ready for use with the liquid vessel destroyed.

Before using the appliance shown, the heating cartridge as in Fig. 3 is inserted into the sleeve 11. Said cartridge embodies an aluminium container 17 which is sealed at its open end by a disc-shaped cover 18 of for example a rigid plastic. Located within the container 17 is a liquid vessel 19 in the form of an ampoule. Around this ampoule there is a pulverized substance 20 adapted for reacting exothermically with the liquid therein, thus producing the heat required. The ampoule may, for instance, contain a mixture of glycerol and water, and the pulverized substance 20 may include potassium permanganate or iron powder and potassium chloride with the possible addition of talcum. To absorb the gases arising from oxidation (which would slow down the reaction in the sealed cartridge), an absorbent such as cellulose, is added to or mixed with the pulverized substance.

The ampoule 19 may consist of glass or an easily frangible plastic destructible with little force.

Figure 2:
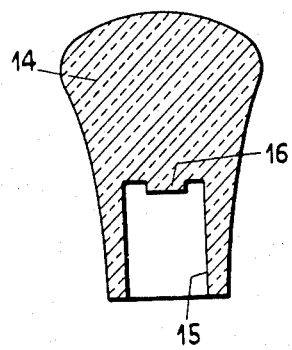
Fig. 2 is a longitudinal section of the handle.

When placing the cartridge shown in Fig. 3 into the sleeve 11 and putting the handle thereon as in Fig. 2, an axial pressure will be exerted by the projections 13, 16 onto the container 17, compresing thereby the liquid ampoule 19. If this consists of glass or suitable easily frangible plastics, this pressure will cause it to burst.

As illustrated, the projections 13 and 16 are provided both on the kneading head as well as on the handle 14 although this is not necessary.

The described design of the massage appliance dispenses with the necessity of especially wetting the heating cartridge. Moreover, due to the separation of the chemicals adopted for the exothermic reaction, storability is increased.

Other obvious modifications will be apparent to those skilled in the art without departing from the scope of the invention as defined in the appended claims.

What I claim is:

1. A massage implement comprising a metal massaging head, a metal sleeve rigid with said head, a handle of heat insulating material removably connected with said sleeve, an interchangeable cartridge removably inserted in said sleeve, an ampoule of destructible material in said cartridge, an exothermically reactable substance in said cartridge around said ampoule, said ampoule containing a fluid for reaction with said substance upon contact therewith and means for breaking said ampoule upon attaching said handle on said sleeve for releasing the fluid from said ampoule for contacting and reacting with said substance.

2. A massage implement as claimed in claim 1, said means for breaking said ampoule including a projection on said handle operatively contactable with said ampoule and upon movement of said handle crushing said ampoule.

3. A massage implement as claimed in claim 1, said means for breaking said ampoule including a projection on said head operatively contactable with said ampoule and upon movement of said handle with respect to said head crushing said ampoule.

4. A massage implement as claimed in claim 1, said means for breaking said ampoule comprising a projection on said handle and a projection on said head both operatively contactable with said ampoule and upon movement of said handle with respect to said head crushing said ampoule.

5. A massage implement as claimed in claim 1, said fluid in said ampoule comprising a mixture of glycerol and water.

6. A massage implement as claimed in claim 1, said substance in said cartridge comprising potassium permanganate.

7. A massage implement as claimed in claim 1, said substance in said cartridge comprising iron powder and potassium chloride.

8. A massage implement as claimed in claim 7 and including talcum in said substance.

9. A massage implement as claimed in claim 8 and including a gas absorbent material in said substance.

WERNER BORCOVEC.

References Cited in the file of this patent

UNITED STATES PATENTS

| Number | Name | Date |
|---|---|---|
| 820,638 | Gabriel | May 15, 1906 |
| 1,833,105 | Aronson | Oct. 26, 1928 |
| 1,978,388 | Reed | Oct. 23, 1934 |
| 2,350,926 | Reed | June 6, 1944 |
| 2,536,001 | Chase | Dec. 26, 1950 |